(12) United States Patent
Lee

(10) Patent No.: US 11,222,520 B2
(45) Date of Patent: *Jan. 11, 2022

(54) PRECISE PREDICTIVE MAINTENANCE METHOD OF DRIVER

(71) Applicant: ITS CO., LTD., Ulsan (KR)

(72) Inventor: Young Kyu Lee, Ulsan (KR)

(73) Assignee: ITS CO., LTD., Ulsan (KR)

( * ) Notice: Subject to any disclaimer, the term of this patent is extended or adjusted under 35 U.S.C. 154(b) by 156 days.

This patent is subject to a terminal disclaimer.

(21) Appl. No.: 16/675,563

(22) Filed: Nov. 6, 2019

(65) Prior Publication Data

US 2020/0074833 A1 Mar. 5, 2020

Related U.S. Application Data

(63) Continuation of application No. PCT/KR2018/015283, filed on Dec. 4, 2018.

(30) Foreign Application Priority Data

Mar. 14, 2018 (KR) .................. 10-2018-0029575

(51) Int. Cl.
*G08B 21/18* (2006.01)
*G05B 23/02* (2006.01)

(52) U.S. Cl.
CPC ......... *G08B 21/187* (2013.01); *G05B 23/027* (2013.01); *G05B 23/0283* (2013.01); *G08B 21/182* (2013.01)

(58) Field of Classification Search
CPC ... G08B 31/00; G08B 21/182; G05B 23/0283
See application file for complete search history.

(56) References Cited

U.S. PATENT DOCUMENTS 5,175,483 A * 12/1992 Fujii ................. H02P 21/13
318/799
5,494,343 A * 2/1996 Lindenman ........... B60T 8/4036
303/122.12
(Continued)

FOREIGN PATENT DOCUMENTS

JP 2000-305618 A 11/2000
JP 2003-280707 A 10/2003
(Continued)

OTHER PUBLICATIONS

International Search Report issued in PCT/KR2018/015283; dated Mar. 18, 2019.
(Continued)

*Primary Examiner* — Nay Tun
(74) *Attorney, Agent, or Firm* — Studebaker & Brackett PC

(57) ABSTRACT

The present invention relates to a precise predictive maintenance method of a driver and the configuration includes: collecting slope information for a peak value between drive periods by connecting the peak value in a respective drive period in a driving state of the driver before a failure of the driver occurs; setting an alarm slope value for the peak value between the drive periods based on the collected slope information; and detecting, in a case where an average slope value for the peak value between the drive periods measured at a unit time interval set in a real-time driving state of the driver is more than the alarm slope value, the case as an abnormal state of the driver.

4 Claims, 13 Drawing Sheets

(56) References Cited

U.S. PATENT DOCUMENTS

| | | | | |
|---|---|---|---|---|
| 5,957,549 | A * | 9/1999 | Nagai | B60T 8/885 |
| | | | | 303/122.12 |
| 6,109,879 | A * | 8/2000 | Yamada | B60T 8/4036 |
| | | | | 303/10 |
| 7,175,241 | B2 * | 2/2007 | Kokubo | B60T 8/4036 |
| | | | | 303/122.05 |
| 8,070,457 | B2 * | 12/2011 | Kallesoe | F04D 15/0245 |
| | | | | 417/44.11 |
| 8,861,110 | B2 * | 10/2014 | Takata | G11B 19/048 |
| | | | | 360/31 |
| 10,732,619 | B2 * | 8/2020 | Lee | G05B 23/0259 |
| 10,847,020 | B2 * | 11/2020 | Lee | G05B 23/0283 |
| 2012/0070168 | A1 * | 3/2012 | Ishizaki | G03G 15/1605 |
| | | | | 399/36 |
| 2013/0082631 | A1 * | 4/2013 | Suzuki | H02P 6/12 |
| | | | | 318/461 |
| 2014/0219071 | A1 * | 8/2014 | Takata | G11B 27/36 |
| | | | | 369/53.1 |
| 2018/0203440 | A1 * | 7/2018 | Lee | G05B 19/4184 |

FOREIGN PATENT DOCUMENTS

| | | | |
|---|---|---|---|
| JP | 2012-083721 A | 4/2012 | |
| JP | 2020-520014 A | 7/2020 | |
| KR | 10-1643599 B1 | 7/2016 | |
| WO | WO-2017010821 A1 * | 1/2017 | ......... G05B 19/4184 |

OTHER PUBLICATIONS

An Office Action; "Notice of Reasons for Refusal", mailed by the Japanese Patent Office dated Aug. 31, 2021, which corresponds to Japanese Patent Application No. 2019-562397 and is related to U.S. Appl. No. 16/675,563; with English language translation.

* cited by examiner

PRECISE PREDICTIVE MAINTENANCE METHOD OF DRIVER

CROSS-REFERENCE TO RELATED APPLICATIONS

The present application is a continuation of International Patent Application No. PCT/KR2018/015283, filed Dec. 4, 2018, which is based upon and claims the benefit of priority to Korean Patent Application No. 10-2018-0029575, filed on Mar. 14, 2018. The disclosures of the above-listed applications are hereby incorporated by reference herein in their entirety.

TECHNICAL FIELD

The present invention relates to a precise predictive maintenance method of a driver and more particularly, to a precise predictive maintenance method of a driver capable of preventing huge losses in advance due to a failure of a driver by measuring and collecting a peak value in a peak period and a constant speed value in a constant speed period in driving information of the driver in a normal state and driving information of the driver before the failure occurs, setting alarm upper and lower limits and alarm slope values for the peak value and the constant speed value based on the collected information, comparing the peak and constant speed values and the slope value collected in real-time by driving of the driver with the alarm upper and lower limits and the alarm slope values, and alarming if a condition that is suspected of abnormal symptoms of the driver is satisfied to induce the maintenance and replacement of the driver at an appropriate time.

BACKGROUND ART

In general, stable driving is very important for drivers (motors, pumps, conveyors, compressors, etc.) used for the automation process of facilities.

For example, hundreds of drivers are installed in the facilities of a large-scale transfer plant to continuously transfer materials to be transferred while interlocking with each other. If any one of the plurality of drivers fails, an enormous situation may occur in which the operation of the facility is stopped as a whole.

At this time, due to the occurrence of downtime due to the failure of the driver, a huge loss is caused by not only the repair cost of the driver, but also operating costs wasted while the equipment is stopped, and business effects.

According to recent data from the Ministry of Employment and Labor and the Korea Occupational Safety and Management Agency, casualties caused by the annual industrial safety accidents are collected at a total of 100,000, and a loss of 18 trillion won annually occurs when converting the casualties into cost.

As a method for avoiding such unexpected downtime costs, it is urgent to introduce a predictive maintenance system. There are already efforts to improve the problem under the name of predictive maintenance, but it is necessary to develop higher predictive maintenance methods for more efficient predictive maintenance.

DISCLOSURE

Technical Problem

In order to solve the problems described above, an object of the present invention is to provide a precise predictive maintenance method of a driver capable of preventing huge losses in advance due to a failure of a driver by measuring and collecting a peak value in a peak period and a constant speed value in a constant speed period in driving information of the driver in a normal state and driving information of the driver before the failure occurs, setting alarm upper and lower limits and alarm slope values for the peak value and the constant speed value based on the collected information, comparing the peak and constant speed values and the slope value collected in real-time by driving of the driver with the alarm upper and lower limits and the alarm slope values, and alarming if a condition that is suspected of abnormal symptoms of the driver is satisfied to induce the maintenance and replacement of the driver at an appropriate time.

Another object of the present invention is to provide a precise predictive maintenance method of a driver capable of easily detecting various abnormal symptoms generated in the driver and securing excellent reliability of the detection result by providing various detection conditions to search for various abnormal symptoms that may occur in the driver and alarming to a user in the case of satisfying the detection conditions.

Technical Solution

According to the present invention, a precise predictive maintenance method of a driver includes: a first base information collecting step (S10) of dividing change information of an energy magnitude depending on a measured time in a normal driving state into a peak period and a constant speed period, setting a largest energy magnitude in the peak period as a peak value, and extracting a last energy value in the constant speed period as a constant speed value, in which the change information of the energy magnitude of the driver depending on a time is formed by repeating a drive period including the peak value and the constant speed value, and collecting slope information for the peak value between the drive periods by connecting the peak value in the drive period and the peak value in another repeated drive period to each other; a second base information collecting step (S20) of collecting the slope information for the peak value between the drive periods by connecting the peak value in the drive period and the peak value in another repeated drive period in a driving state of the driver before a failure of the driver occurs; a setting step (S30) of setting an alarm slope value for the peak value between the drive periods based on the slope information collected in the base information collecting steps (S10 and S20); and a detecting step (S40) of detecting, in a case where an average slope value for the peak value between the drive periods measured at a unit time interval set in a real-time driving state of the driver is more than the alarm slope value set in the setting step (S30), the case as an abnormal state of the driver, in which the unit time is set as a time including two or more drive periods, and as energy measured through the driver, any one of current consumed for driving of the driver, vibration generated when the driver is driven, noise generated when the driver is driven, a frequency of supply power of the driver, and a temperature, a humidity, and a pressure of the driver when the driver is driven is selected and used.

Further, in the first base information collecting step (S10), the slope information for the constant speed value between the drive periods is collected by connecting the constant speed value in the drive period and the constant speed value in another repeated drive period to each other in the normal driving state of the driver, in the second base information collecting step (S20), the slope information for the constant speed value between the drive periods is collected by connecting the constant speed value in the drive period and the constant speed value in another repeated drive period to each other in the driving state of the driver before the failure of the driver occurs, in the setting step (S30), the alarm slope value for the constant speed value between the drive periods is set based on the slope information collected in the base information collecting steps, and in the detecting step (S40), in the case where the average slope value for the constant speed value between the drive periods measured at the unit time interval set in the real-time driving state of the driver is more than the alarm slope value set in the setting step (S30), the case is detected as the abnormal state of the driver, and the unit time is set as a time including two or more drive periods.

Further, as the drive period, the repeated drive period is extracted by setting a point where the energy value of the driver exceeds and is more than a set offset value as a start point and setting a point where the energy value of the driver is less than the offset value as an end point and setting a period between the start point and the end point as the drive period, or the change information of the energy magnitude depending on the time of the driver is forcibly partitioned according to a set time interval and the partitioned period is set as the drive period to extract the repeated drive period.

Further, in the first base information collecting step (S10), information on each of the peak value and the constant speed value is collected in the change information of the energy magnitude depending on the time measured in the normal driving state of the driver, in the second base information collecting step (S20), the information on each of the peak value and the constant speed value is collected in the change information of the energy magnitude depending on the time measured in the driving state of the driver before the failure of the driver occurs, in the setting step (S30), each of an alarm upper limit value and an alarm lower limit value for the peak value and the constant speed value is set based on the information collected in the base information collecting steps (S10 and S20), and in the detecting step (S40), when the peak value or the constant speed value exceeds the alarm upper limit value of the peak value or the constant speed value set in the setting step (S30) or is less than the alarm lower limit value in the change information of the energy magnitude depending on the time measured in the real-time driving state of the driver, the driver is detected to be in the abnormal state.

Advantageous Effects

According to the precise predictive maintenance method of the driver of the present invention, it is possible to prevent huge losses due to a failure of a driver by measuring and collecting a peak value in a peak period and a constant speed value in a constant speed period in driving information of the driver in a normal state and driving information of the driver before the failure occurs, setting alarm upper and lower limits and alarm slope values for the peak value and the constant speed value based on the collected information, comparing the peak and constant speed values and the slope value collected in real-time by driving of the driver with the upper and lower limits and the alarm slope values, and alarming if a condition that is satisfied of abnormal symptoms of the driver is satisfied to induce the maintenance and replacement of the driver at an appropriate time.

Further, it is possible to easily detect various abnormal symptoms generated in the driver and secure excellent reliability of the detection result by providing various detection conditions to search for various abnormal symptoms that may occur in the driver and alarming to a user in the case of satisfying the detection conditions.

DESCRIPTION OF MAIN REFERENCE NUMERALS OF DRAWINGS

S10: First base information collecting step
S20: Second base information collecting step
S30: Setting step
S40: Detecting step
100: Precise predictive maintenance method of driver Best Mode The present invention relates to a precise predictive maintenance method of a driver and the configuration includes: a first base information collecting step (S10) of dividing change information of an energy magnitude depending on a measured time in a normal driving state into a peak period and a constant speed period, setting and extracting a largest energy magnitude in the peak period as a peak value, and a last energy value in the constant speed period as a constant speed value, in which the change information of the energy magnitude of the driver depending on a time is formed by repeating a drive period including the peak value and the constant speed value, and collecting slope information for the peak value between the drive periods by connecting the peak value in the drive period and the peak value in another repeated drive period to each other; a second base information collecting step (S20) of collecting the slope information for the peak value between the drive periods by connecting the peak value in the drive period and the peak value in another repeated drive period in a driving state of the driver before a failure of the driver occurs; a setting step (S30) of setting an alarm slope value for the peak value between the drive periods based on the slope information collected in the base information collecting steps (S10 and S20); and a detecting step (S40) of detecting, in a case where an average slope value for the peak value between the drive periods measured at a unit time interval set in a real-time driving state of the driver is more than the alarm slope value set in the setting step (S30), the case as an abnormal state of the driver.

Mode for Invention

A precise predictive maintenance method of the driver according to a preferred embodiment of the present invention will be described in detail with reference to the accompanying drawings. The detailed description of publicly-known function and configuration that may make the gist of the present invention unnecessarily ambiguous will be omitted.

Figure 1:
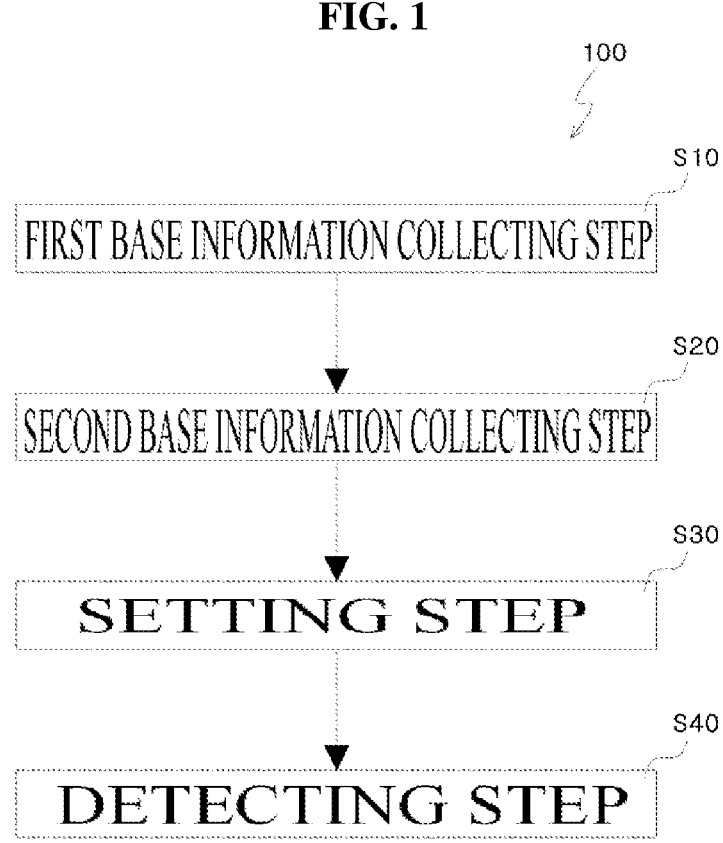
FIG. 1 is a block diagram of a precise predictive maintenance method of a driver according to an embodiment of the present invention.
Figure 2:
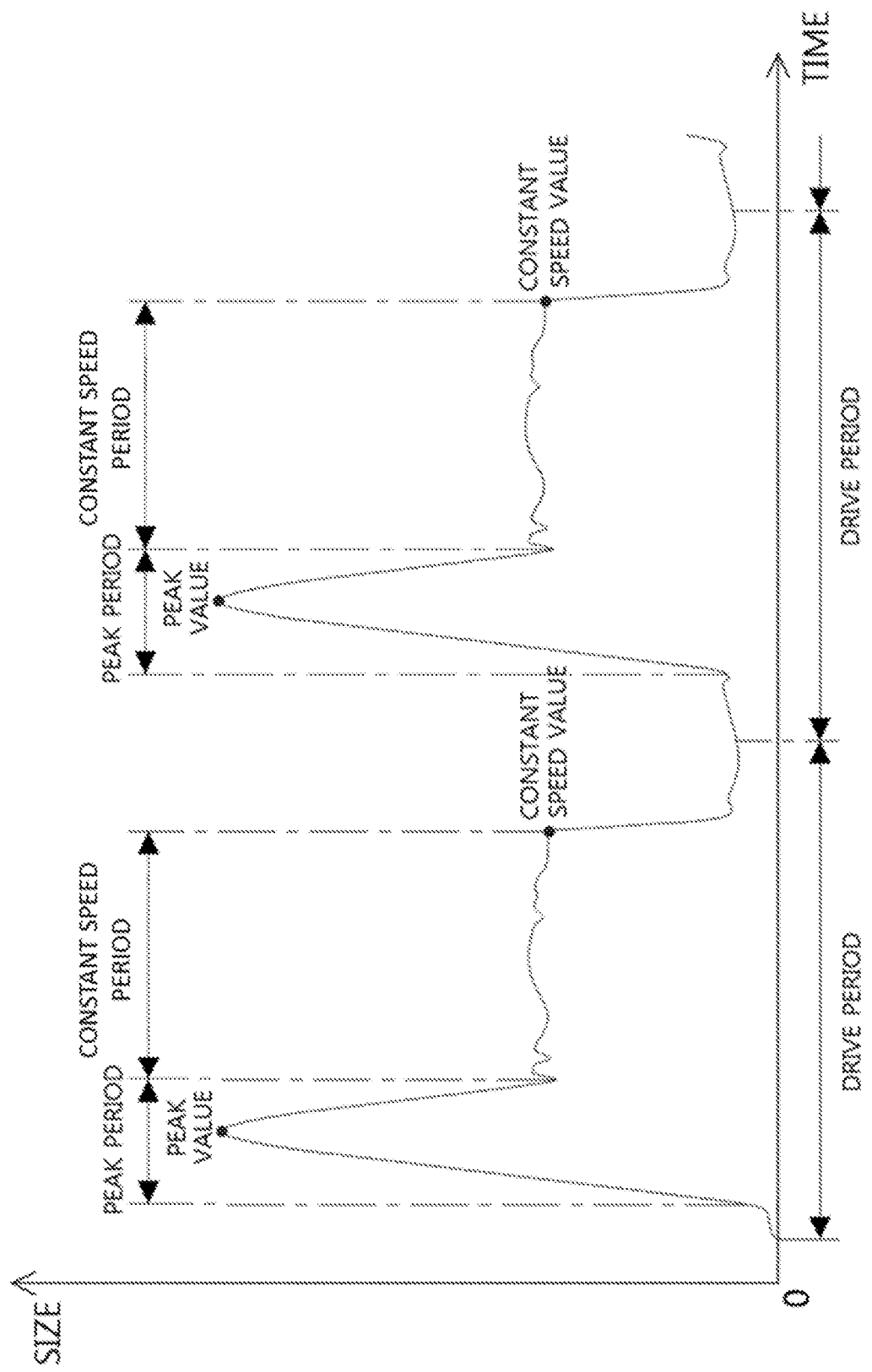
FIG. 2 is a diagram for extracting peak and constant speed values from peak and constant speed periods of a drive period.
Figure 3:
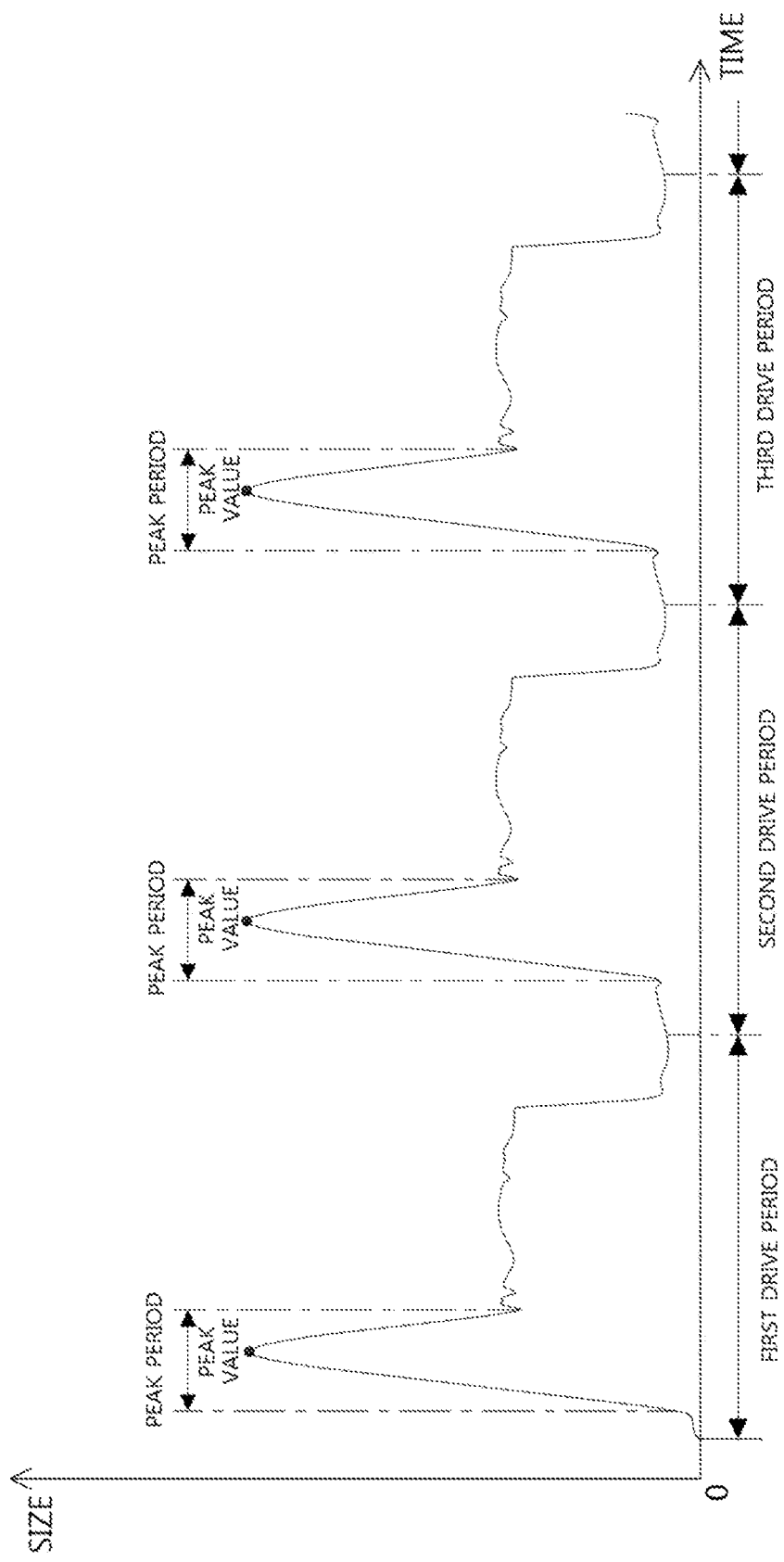
FIG. 3 is a diagram for extracting peak values in repeated drive periods of the driver.
Figure 4:
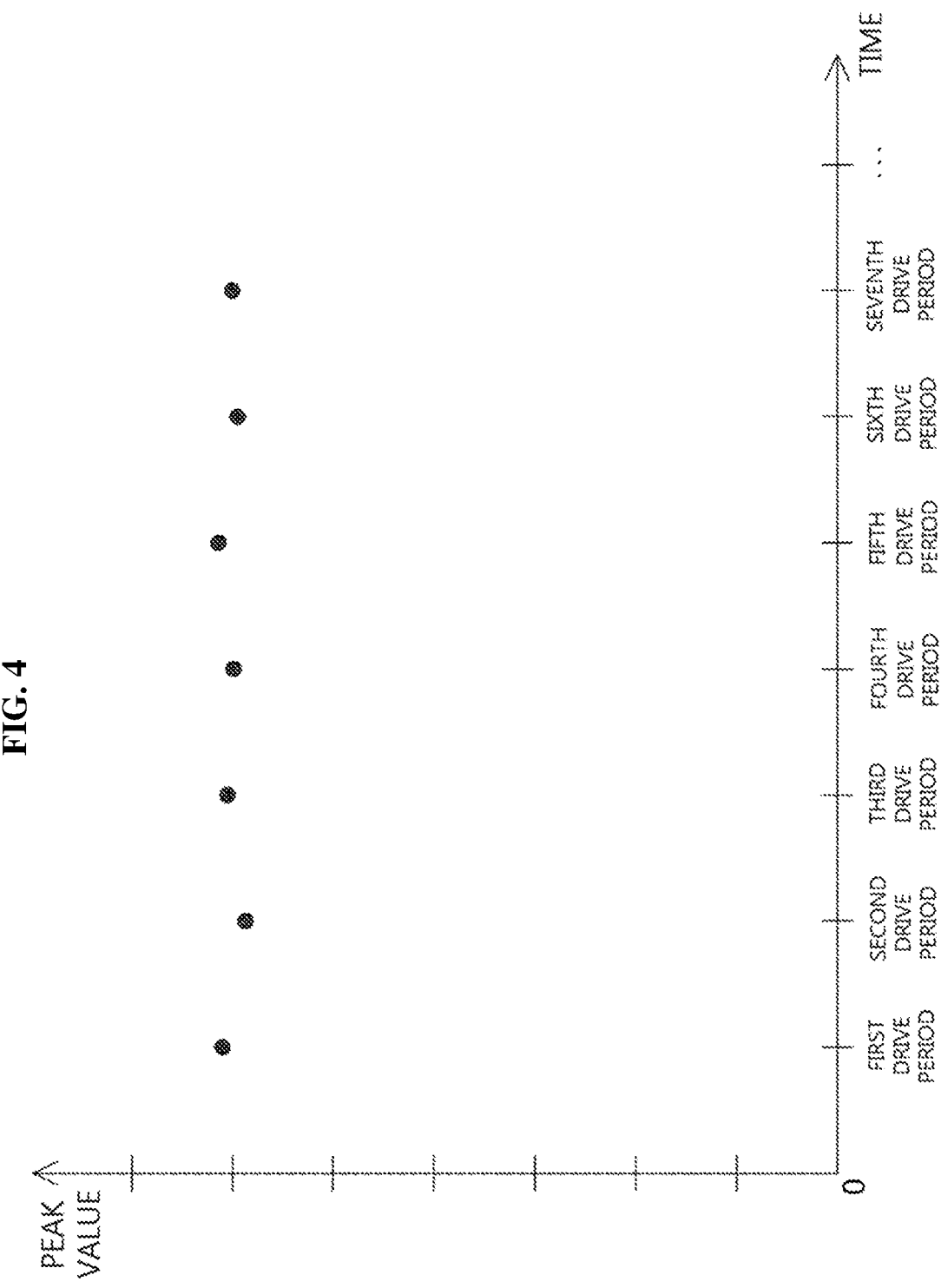
FIG. 4 is a diagram showing numerically the peak values illustrated in FIG. 3.
Figure 5:
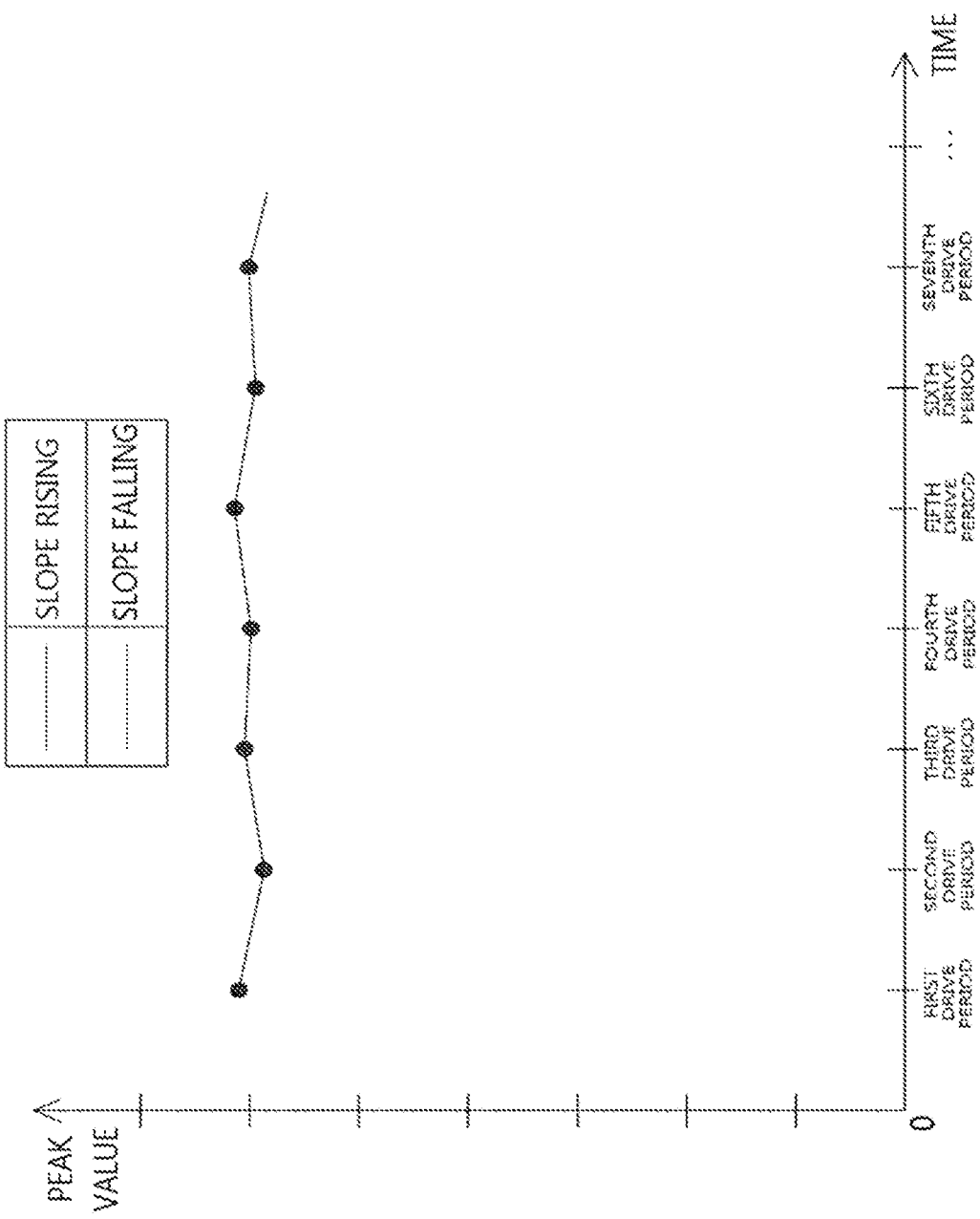
FIG. 5 is a diagram for extracting slope values based on the peak values illustrated in FIG. 4.
Figure 6:
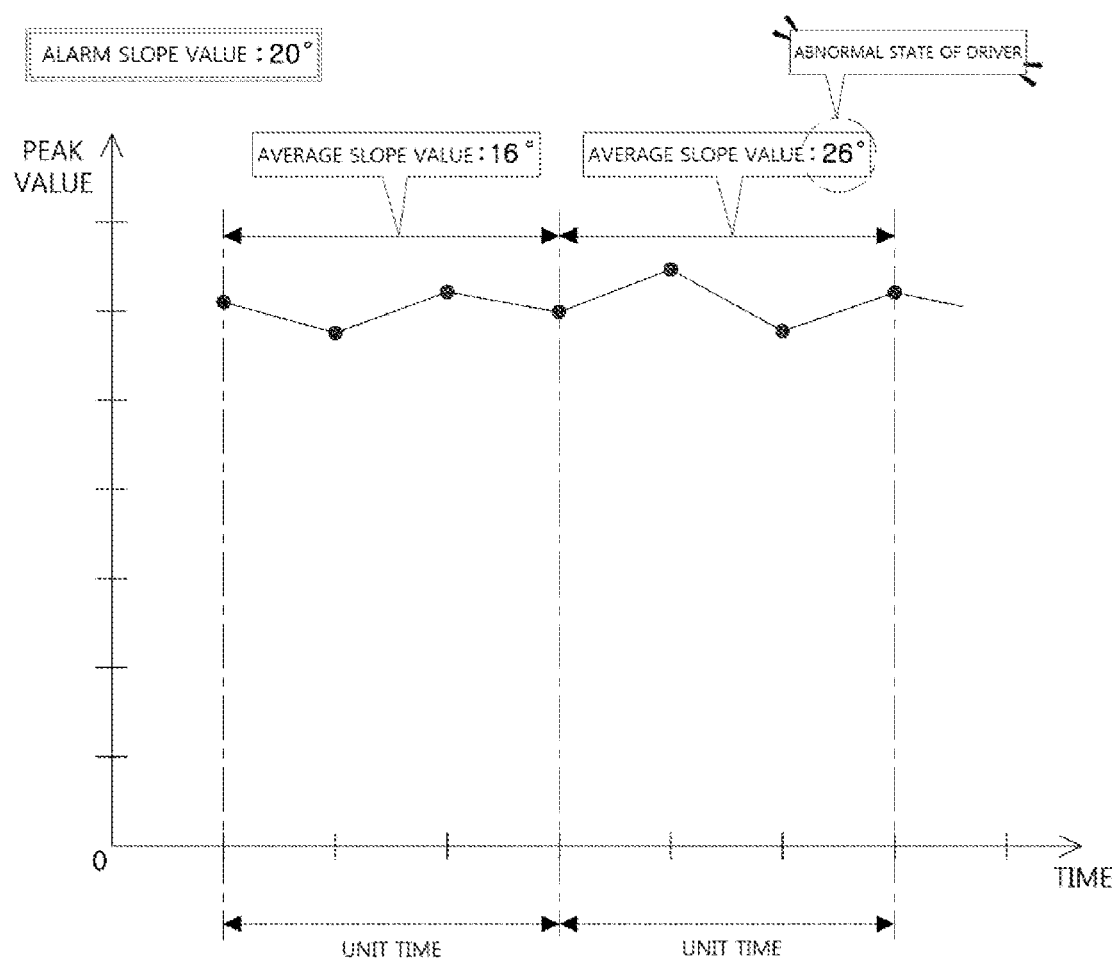
FIG. 6 is a diagram for extracting average slope values of peak values between drive periods measured at unit time intervals.
Figure 7:
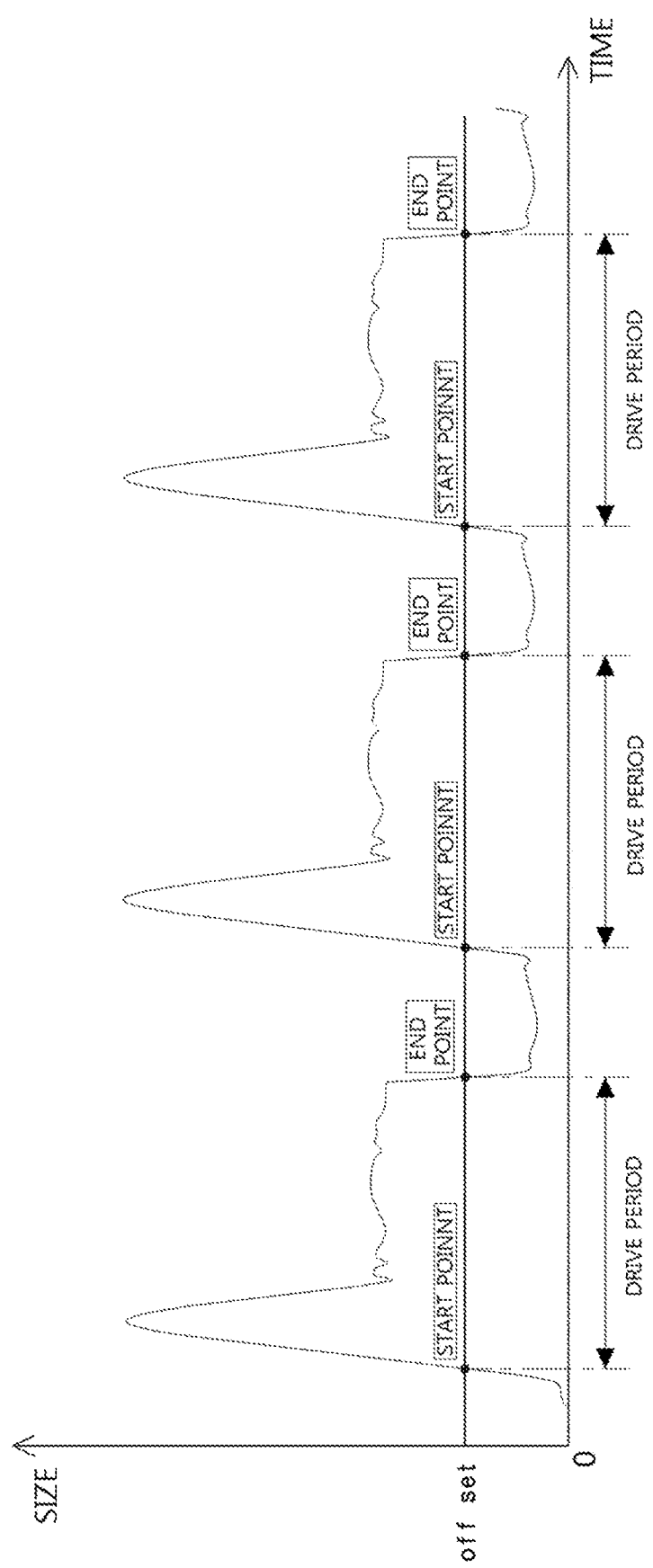
FIG. 7 is a diagram for extracting a drive period from a driver in which driving and pause are repeated.
Figure 8:
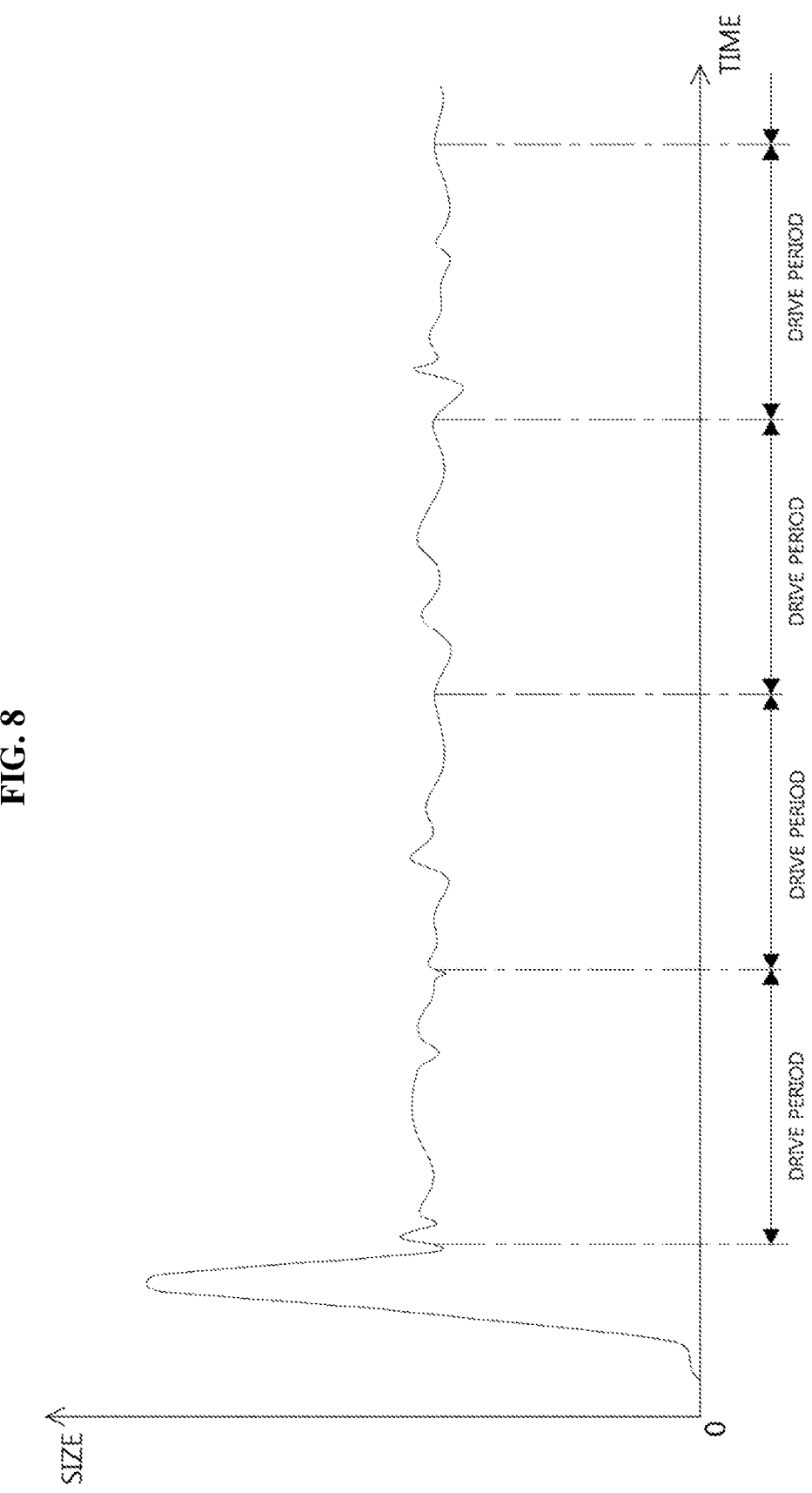
FIG. 8 is a diagram for extracting a drive period from a driver which is consecutively driven.
Figure 9:
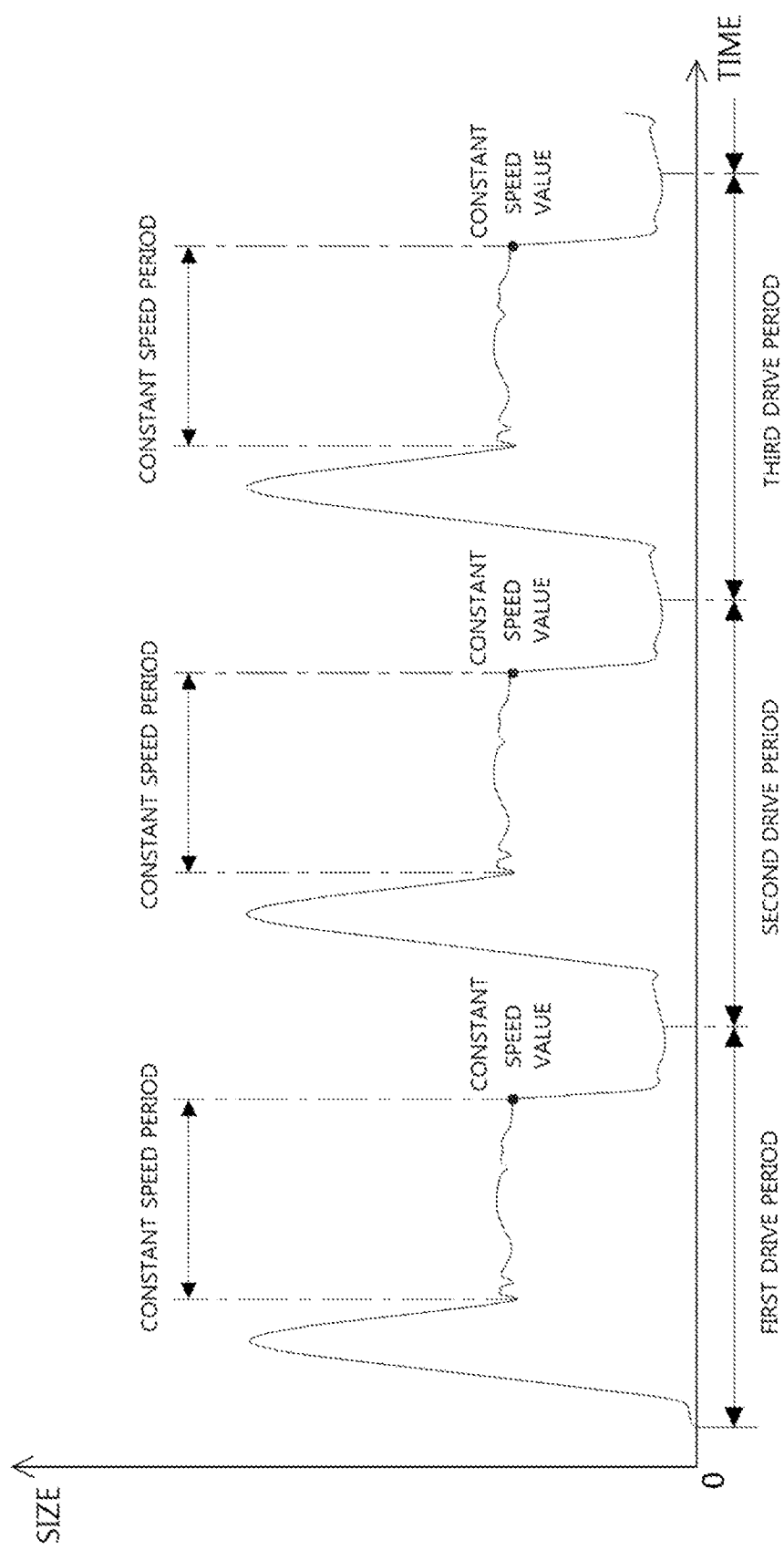
FIG. 9 is a diagram for extracting a constant speed value in a repeated drive period of a driver.
Figure 10:
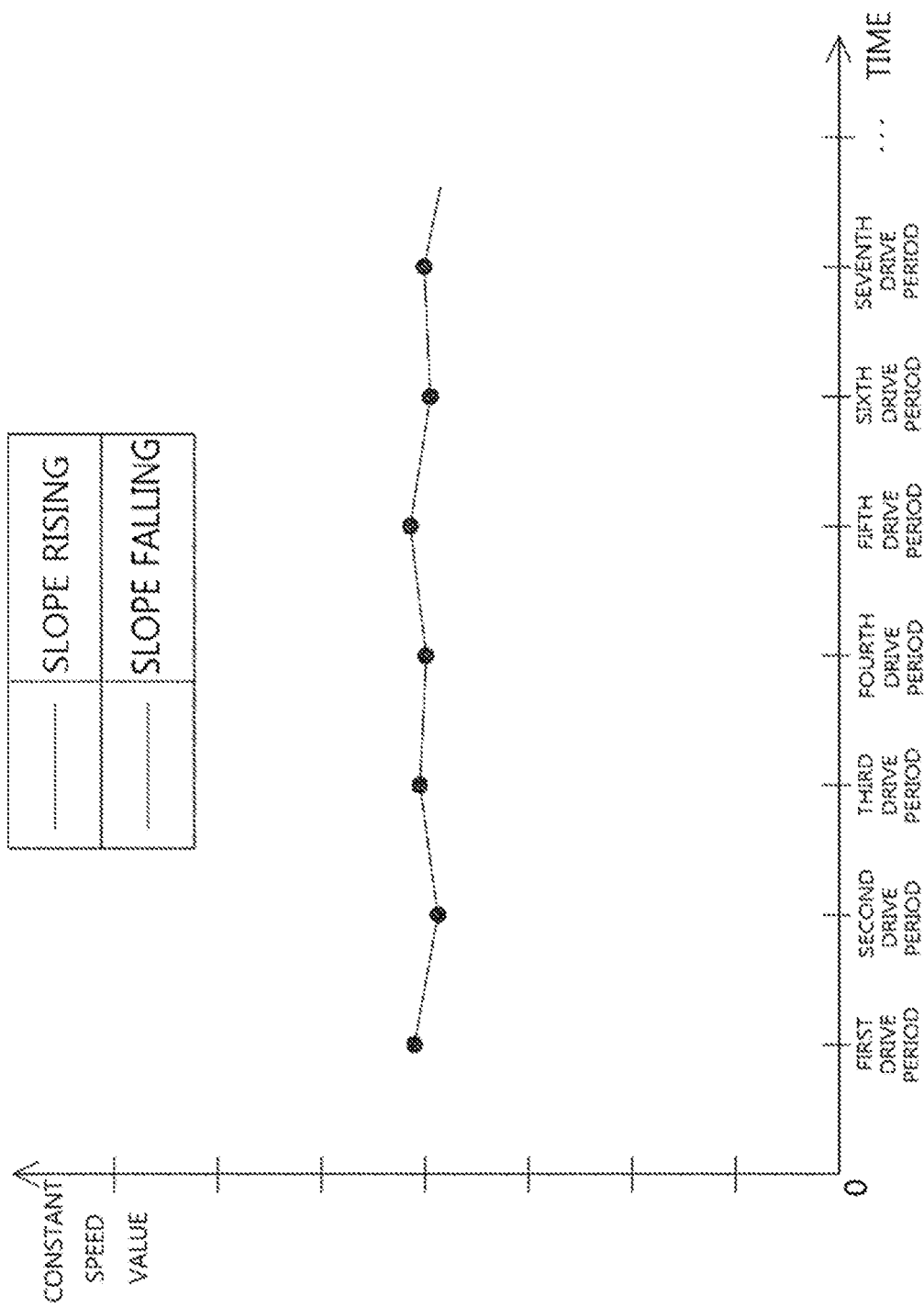
FIG. 10 is a diagram for extracting a slope value based on the constant speed value illustrated in FIG. 9.
Figure 11:
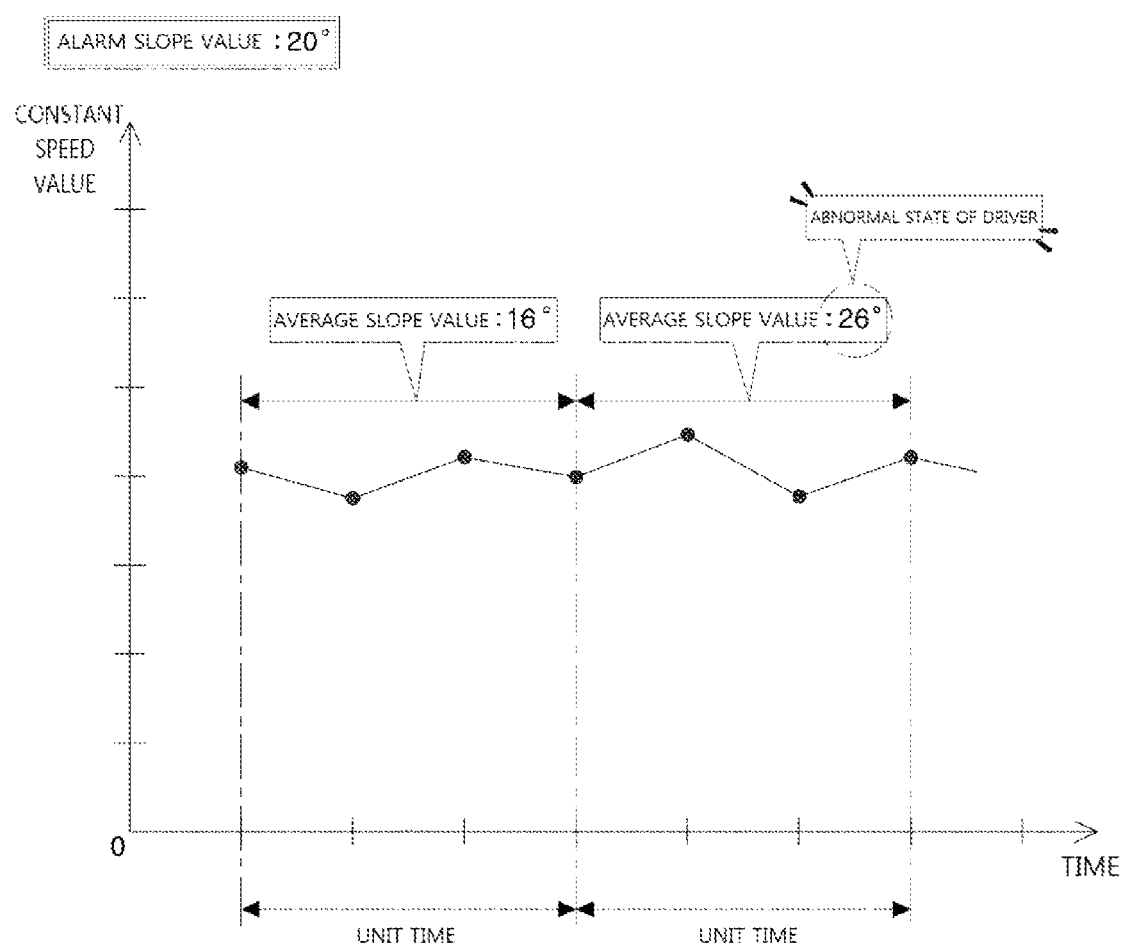
FIG. 11 is a diagram for extracting an average slope value of constant speed values between drive periods measured at a unit time interval.
Figure 12:
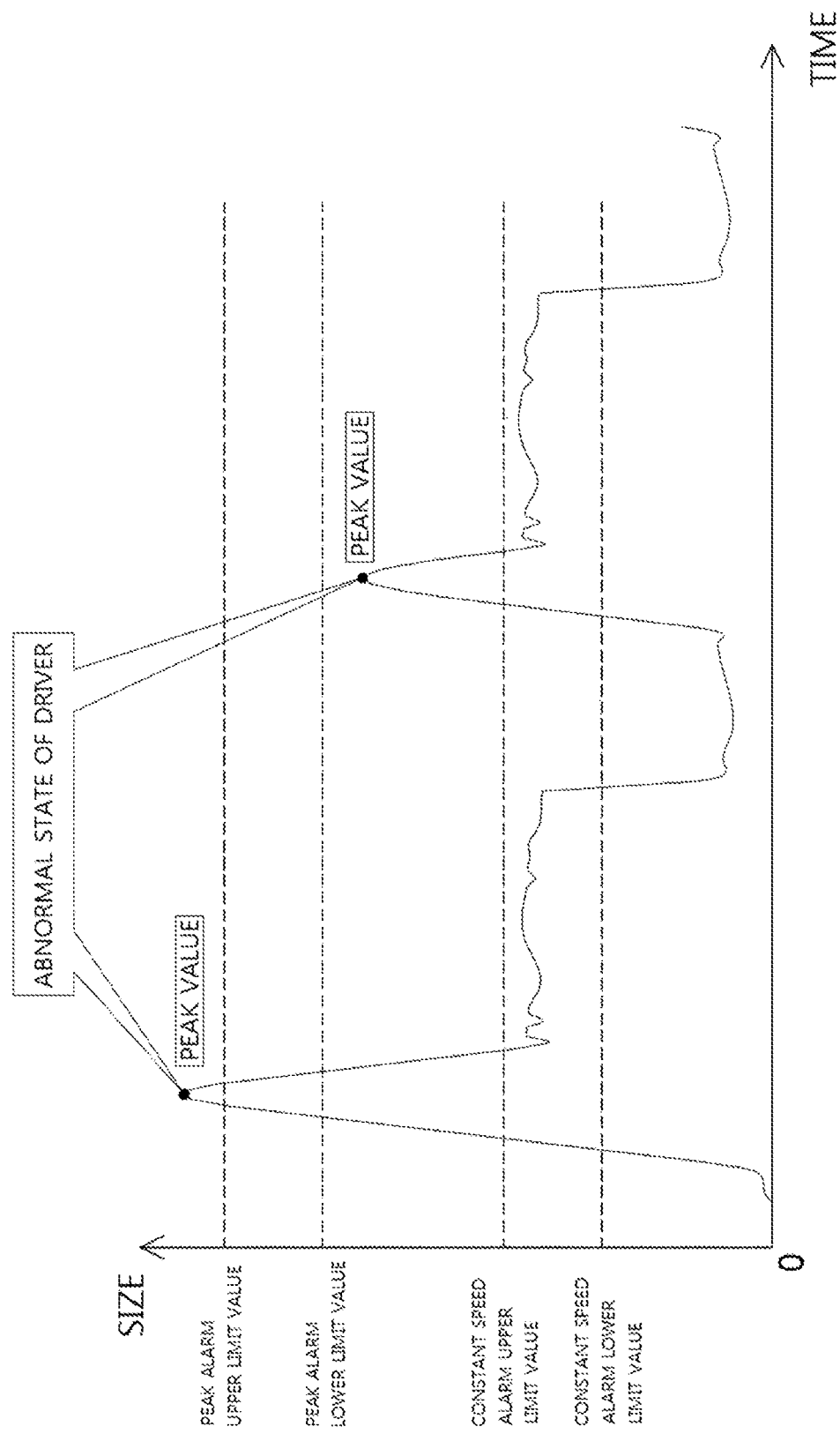
FIG. 12 is a diagram for detecting an abnormal state of a driver with a peak value measured in a real-time driving state of the driver.
Figure 13:
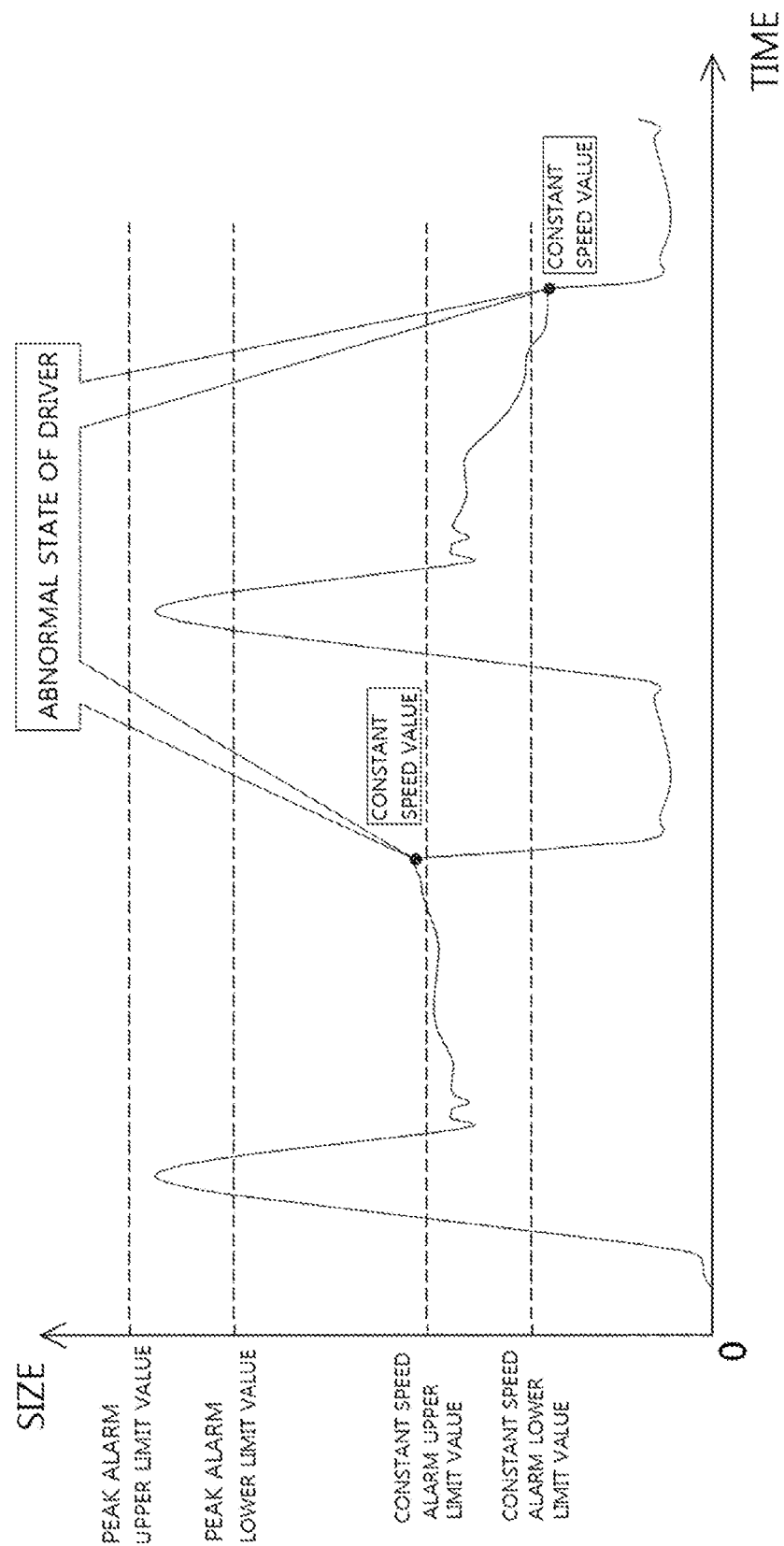
FIG. 13 is a diagram for detecting an abnormal state of a driver with a constant speed value measured in a real-time driving state of the driver.

FIGS. 1 to 13 are diagrams illustrating a precise predictive maintenance method of a driver according to an embodiment of the present invention and FIG. 1 is a block diagram of a precise predictive maintenance method of a driver according to an embodiment of the present invention, FIG. 2 is a diagram for extracting peak and constant speed values from peak and constant speed periods of a drive period, FIG. 3 is a diagram for extracting peak values in repeated drive periods of the driver, FIG. 4 is a diagram showing numerically the peak values illustrated in FIG. 3, FIG. 5 is a diagram for extracting slope values based on the peak values illustrated in FIG. 4, FIG. 6 is a diagram for extracting average slope values of peak values between drive periods measured at unit time intervals, FIG. 7 is a diagram for extracting a drive period from a driver in which driving and pause are repeated, FIG. 8 is a diagram for extracting a drive period from a driver which is consecutively driven, FIG. 9 is a diagram for extracting a constant speed value in a repeated drive period of a driver, FIG. 10 is a diagram for extracting a slope value based on the constant speed value illustrated in FIG. 9, FIG. 11 is a diagram for extracting an average slope value of constant speed values between drive periods measured at a unit time interval, FIG. 12 is a diagram for detecting an abnormal state of a driver with a peak value measured in a real-time driving state of the driver, and FIG. 13 is a diagram for detecting an abnormal state of a driver with a constant speed value measured in a real-time driving state of the driver.

As illustrated in FIG. 1, the precise predictive maintenance method 100 of the driver according to an embodiment of the present invention includes a first base information collecting step (S10), a second base information collecting step (S20), a setting step (S30), and a detecting step (S40).

The first base information collecting step (S10) is a step of dividing change information of an energy magnitude depending on a measured time in a normal driving state of a driver into a peak period and a constant speed period, setting and extracting a largest energy magnitude in the peak period as a peak value, and a last energy value in the constant speed period as a constant speed value, in which the change information of the energy magnitude of the driver depending on a time is formed by repeating a drive period including the peak value and the constant speed value, and collecting slope information for the peak value between the drive periods by connecting the peak value in the drive period and the peak value in another repeated drive period to each other.

Here, when the energy of the driver is assumed to be a current consumed to operate the driver, in general, at the time when the driving of the driver starts, the use of a high current is required so that an energy magnitude of the driver is formed to a maximum value and such a period is set as a peak period and the driver is stabilized and an energy value in a predetermined range is consecutively maintained and such a period may be set as a constant speed period.

That is, as illustrated in FIG. 2, in the precise predictive maintenance method 100 of the driver according to the present invention, basically, the drive period of the driver is set into the peak period and the constant speed period and in the peak period, a peak value is extracted and in the constant speed period, a constant speed value is extracted and collected.

A slope for the peak value is measured through the peak value between the drive periods collected as such and the measured slope will be described below in detail.

The collected information becomes a basis of various alarm values set to detect an abnormal symptom of the driver in the setting step (S30) and the detecting step (S40) to be described below.

Meanwhile, as energy measured through the driver, any one of current consumed for driving of the driver, vibration generated when the driver is driven, noise generated when the driver is driven, a frequency of supply power of the driver, and a temperature, a humidity, and a pressure of the driver when the driver is driven is selected and used, but the energy is not limited and used to such a type.

The second base information collecting step (S20) is a step of collecting the slope information for the peak value between the drive periods by connecting the peak value in the drive period and the peak value in another repeated drive period to each other in the driving state of the driver before the failure of the driver occurs.

The collected information also becomes a basis of various alarm values set to detect an abnormal symptom of the driver in the setting step (S30) and the detecting step (S40) like the information collected in the first base information collecting step (S10).

The setting step (S30) is a step of setting an alarm slope value for the peak value between the drive periods based on the slope information collected in the base information collecting steps (S10 and S20).

That is, the alarm slope value for the peak value between the drive periods is set based on a value generated through an abnormal change of the slope for the peak value between the drive periods, before the failure of the driver occurs, based on the information collected for a long time in the base information collecting steps (S10 and S20), i.e., a value in which the slope value for the peak value between the drive periods is abnormally changed in a situation such as deterioration, decrepitude, and a load bycatch of a foreign matter, etc. of the driver.

In the detecting step (S40), in the case where the average slope value for the peak value between the drive periods measured at the unit time interval set in the real-time driving state of the driver is more than the alarm slope value set in the setting step (S30), the case is detected as the abnormal state of the driver, and the unit time is set as a time including two or more drive periods.

That is, as illustrated in FIG. 3, in the first base information collecting step S10, the peak values are collected in the repeated drive periods of the driver, respectively and the peak values of the respective drive periods are illustrated with time and for the convenience of description, when the drive periods are determined as a first drive period, a second drive period, . . . , an n-th drive period, the drive periods may be represented as illustrated in FIG. 4.

Then, as illustrated in FIG. 5, when the peak values of the drive periods are connected to each other, a predetermined slope value may be obtained, and the slope value may be divided into a rising slope value (positive value) in which the slope rises and a falling slope value (negative value) in which the slope falls, but both the slope values may be quantified and collected as absolute values.

The information on the collected slope value is recognized as information indicating that the driver is stably driven in the normal state.

In the second base information collecting step (S20), the slope information for the peak value between the drive periods of the driver before the failure of the driver occurs is collected by the same scheme as the first base information collecting step (S10) and in the setting step (S30), the alarm slope value for the peak value between the drive periods is set based on the slope information collected in the base information collecting steps (S10 and S20).

Accordingly, as illustrated in FIG. 6, in the detecting step (S40), in the case where the average slope value by connecting the peak values between the drive periods measured at the unit time interval set in the real-time driving state of the driver is more than the alarm slope value set in the setting step (S30), the case is detected as the abnormal state of the driver.

Here, the unit time as a time set in the setting step (S30) to include two or more drive periods may be set to units of at least several seconds and at most a day, a month, a year, etc., by considering a driving condition, a surrounding environment, etc., of the driver.

As the drive period, the drive period is set by setting a point where the energy value of the driver exceeds and is more than a set offset value as a start point and setting a point where the energy value of the driver is less than the offset value as an end point and setting a period between the start point and the end point as the drive period to definitely extract the repeated drive period from the driver in which driving and pause are repeatedly performed as illustrated in FIG. 7 to derive easy predictive maintenance of the driver.

In addition, as illustrated in FIG. 7 through the setting of the offset value, even when the driver is not completely stopped when the driver is paused, the drive period of the driver may be forcibly extracted by setting a point where the energy value of the driver falls below the offset value as the end point, thereby deriving easy predictive maintenance of the driver having various driving conditions.

Further, the change information of the energy magnitude of the driver depending on the time is forcibly partitioned according to a set time interval and the partitioned period is set as the drive period to extract the repeated drive period.

That is, as illustrated in FIG. 8, once the driver is driven, since the repeated drive period may not be extracted when the driver is consecutively driven without pause, the constant speed period is forcibly partitioned according to the time interval set in setting step (S30) and extracted into multiple drive periods, thereby deriving easy predictive maintenance of the driver having various driving conditions.

Here, the scheme of extracting the drive period of the driver by setting the offset value or the time interval may be applied to and used in the predictive maintenance method of the driver to be described below, of course.

Further, in the first base information collecting step (S10), the slope information for the constant speed value between the drive periods by connecting the constant speed value in the drive period and the constant speed value in another repeated drive period to each other in the normal driving state of the driver, in the second base information collecting step (S20), the slope information for the constant speed value between the drive periods is collected by connecting the constant speed value in the drive period and the constant speed value in another repeated drive period to each other in the driving state of the driver before the failure of the driver occurs, in the setting step (S30), the alarm slope value for the constant speed value between the drive periods is set based on the slope information collected in the base information collecting steps, and in the detecting step (S40), in the case where the average slope value for the constant speed value between the drive periods measured at the unit time interval set in the real-time driving state of the driver is more than the alarm slope value set in the setting step (S30), the case is detected as the abnormal state of the driver, and the unit time is set as a time including two or more drive periods.

That is, as illustrated in FIG. 9, in the first base information collecting step S10, the constant speed value in the repeated drive period of the driver and the constant speed value in another drive period are collected and for the convenience of description, when the drive periods are determined as a first drive period, a second drive period, . . . , an n-th drive period, the drive periods may be represented as illustrated in FIG. 10.

Then, as illustrated in FIG. 10, when the constant speed values between the drive periods are connected to each other, a predetermined slope value may be obtained, and the slope value may be divided into a rising slope value (positive value) in which the slope rises and a falling slope value (negative value) in which the slope falls, but the slope values are quantified and collected as the absolute values.

The information on the collected slope value is recognized as information indicating that the driver is stably driven in the normal state.

In the second base information collecting step (S20), the slope information for the constant speed value between the drive periods of the driver before the failure of the driver occurs is collected by the same scheme as the first base information collecting step (S10) and in the setting step (S30), the alarm slope value for the constant speed value between the drive periods is set based on the slope information collected in the base information collecting steps (S10 and S20).

Accordingly, as illustrated in FIG. 11, in the detecting step (S40), in the case where the average slope value acquired by connecting the constant speed values between the drive periods measured at the unit time interval set in the real-time driving state of the driver exceeds the alarm slope value set in the setting step (S30), the case is detected as the abnormal state of the driver.

Here, the unit time as a time set in the setting step (S30) to include two or more drive periods may be set to units of at least several seconds and at most a day, a month, a year, etc., by considering a driving condition, a surrounding environment, etc., of the driver.

Further, in the first base information collecting step (S10), information on each of the peak value and the constant speed value is collected in the change information of the energy magnitude depending on the time measured in the normal driving state of the driver, in the second base information collecting step (S20), the information on each of the peak value and the constant speed value is collected in the change information of the energy magnitude depending on the time measured in the driving state of the driver before the failure of the driver occurs, in the setting step (S30), each of an alarm upper limit value and an alarm lower limit value for the peak value and the constant speed value is set based on the information collected in the base information collecting steps (S10 and S20), and in the detecting step (S40), when the peak value or the constant speed value exceeds the alarm upper limit value of the peak value or the constant speed value set in the setting step (S30) or is less than the alarm lower limit value in the change information of the energy magnitude depending on the time measured in the real-time driving state of the driver, the driver is detected to be as the abnormal state.

That is, the alarm upper limit value and lower limit value for each of the peak value and the constant speed value are set based on values generated through abnormal change of the peak value and the constant speed value of the driver before the failure of the driver occurs based on the information collected for a long time in the base information collecting steps (S10 and S20).

Therefore, as illustrated in FIGS. 12 and 13, in a case where the peak value or the constant speed value measured in the real-time driving state of the driver exceeds the alarm upper limit value or is less than the alarm lower limit value, the driver is detected to be as the abnormal state and management such as replacement or repairing is performed in advance before the failure of the driver occurs, thereby preventing economic losses caused by stopping the operation of the facility due to the failure of the driver.

According to the precise predictive maintenance method 100 of the driver of the present invention, which detects an abnormal symptom of the driver by the above process, it is possible to prevent huge losses due to a failure of a driver by measuring and collecting a peak value in a peak period and a constant speed value in a constant speed period in driving information of the driver in a normal state and driving information of the driver before the failure occurs, setting alarm upper and lower limits and alarm slope values for the peak value and the constant speed value based on the collected information, comparing the peak and constant speed values and the slope value collected in real-time by driving of the driver with the upper and lower limits and the alarm slope values, and alarming if a condition that is suspected of abnormal symptoms of the driver is satisfied to induce the maintenance and replacement of the driver at an appropriate time.

Further, it is possible to easily detect various abnormal symptoms generated in the driver and secure excellent reliability of the detection result by providing various detection conditions to search for various abnormal symptoms that may occur in the driver and alarming to a user in the case of satisfying the detection conditions.

On the other hand, the precise predictive maintenance method 100 of the driver according to an embodiment of the present invention may be implemented through a combination of various electronic devices and programs that may collect, detect, contrast, and alarm the energy value of the driver.

The present invention has been described with reference to the embodiment illustrated in the accompanying drawings and is just exemplary and is not limited to the above-described embodiments, but it will be appreciated by those skilled in the art that various modifications and embodiments equivalent thereto can be made therefrom. In addition, modifications by those skilled in the art can be made without departing from the scope of the present invention. Therefore, the scope of the claims in the present invention will not be defined within the scope of the detailed description but will be defined by the following claims and the technical spirit thereof.

The invention claimed is:

1. A precise predictive maintenance method of a driver used for various facilities, the method comprising:
a first base information collecting step (S10) of dividing change information of an energy magnitude depending on a measured time in a normal driving state of the driver into a peak period and a constant speed period, setting and extracting a largest energy magnitude in the peak period as a peak value, and a last energy value in the constant speed period as a constant speed value, in which the change information of the energy magnitude of the driver depending on a time is formed by repeating a drive period including the peak value and the constant speed value, and collecting slope information for the peak value between the drive periods by connecting the peak value in the drive period and the peak value in another repeated drive period to each other;
a second base information collecting step (S20) of collecting the slope information for the peak value between the drive periods by connecting the peak value in the drive period and the peak value in another repeated drive period in a driving state of the driver before a failure of the driver occurs; a setting step (S30) of setting an alarm slope value for the peak value between the drive periods based on the slope information collected in the base information collecting steps (S10 and S20); and
a detecting step (S40) of detecting, in a case where an average slope value for the peak value between the drive periods measured at a unit time interval set in a real-time driving state of the driver is more than the alarm slope value set in the setting step (S30), the case as an abnormal state of the driver and alarming if the abnormal state of the driver is detected,
wherein the unit time is set as a time including two or more drive periods, and
as energy measured through the driver, current consumed for driving of the driver is used,
wherein in the first base information collecting step (S10), the slope information for the constant speed value between the drive periods is collected by connecting the constant speed value in the drive period and the constant speed value in another repeated drive period to each other in the normal driving state of the driver,
in the second base information collecting step (S20), the slope information for the constant speed value between the drive periods is collected by connecting the constant speed value in the drive period and the constant speed value in another repeated drive period to each other in the driving state of the driver before the failure of the driver occurs,
in the setting step (S30), the alarm slope value for the constant speed value between the drive periods is set based on the slope information collected in the base information collecting steps, and
in the detecting step (S40), in the case where the average slope value for the constant speed value between the drive periods measured at the unit time interval set in the real-time driving state of the driver is more than the alarm slope value set in the setting step (S30), the case is detected as the abnormal state of the driver.

2. The precise predictive maintenance method of a driver of claim 1, wherein as the drive period, the repeated drive period is extracted by setting a point where the energy value of the driver exceeds and is more than a set offset value as a start point and setting a point where the energy value of the driver is less than the offset value as an end point and setting a period between the start point and the end point as the drive period, or the change information of the energy magnitude of the driver depending on the time is forcibly partitioned according to the set time interval and the partitioned period is set as the drive period to extract the repeated drive period.

3. The precise predictive maintenance method of a driver of claim 1, wherein in the first base information collecting step (S10), information on each of the peak value and the constant speed value is collected in the change information of the energy magnitude depending on the time measured in the normal driving state of the driver, in the second base information collecting step (S20), the information on each of the peak value and the constant speed value is collected in the change information of the energy magnitude depending on the time measured in the driving state of the driver before the failure of the driver occurs, in the setting step (S30), each of an alarm upper limit value and an alarm lower limit value for the peak value and the constant speed value is set based on the information collected in the base information collecting steps (S10 and S20), and in the detecting step (S40), when the peak value or the constant speed value exceeds the alarm upper limit value of the peak value or the constant speed value set in the setting step (S30) or is less than the alarm lower limit value in the change information of the energy magnitude depending on the time measured in the real-time driving state of the driver, the driver is detected to be as the abnormal state.

4. The precise predictive maintenance method of a driver of claim 1, wherein as the drive period, the repeated drive period is extracted by setting a point where the energy value of the driver exceeds and is more than a set offset value as a start point and setting a point where the energy value of the driver is less than the offset value as an end point and setting a period between the start point and the end point as the drive period, or the change information of the energy magnitude of the driver depending on the time is forcibly partitioned according to the set time interval and the partitioned period is set as the drive period to extract the repeated drive period.

\* \* \* \* \*